United States Patent [19]

Wright

[11] 4,236,691

[45] Dec. 2, 1980

[54] BALL VALVE TO RELIEVE CAVITY PRESSURE

[75] Inventor: Joseph B. Wright, Northboro, Mass.

[73] Assignee: Jamesbury Corporation, Worcester, Mass.

[21] Appl. No.: 964,653

[22] Filed: Nov. 29, 1978

[51] Int. Cl.³ .............................................. F16K 5/06
[52] U.S. Cl. ..................................... 251/315; 251/172
[58] Field of Search ................................. 251/315, 172

[56] References Cited

U.S. PATENT DOCUMENTS

| | | | |
|---|---|---|---|
| 2,945,666 | 7/1960 | Freeman et al. | 251/315 |
| 3,146,988 | 9/1964 | Riopelle et al. | 251/315 |
| 3,269,693 | 8/1966 | Gulick | 251/172 |
| 3,345,032 | 10/1967 | Rawstron | 251/172 |
| 3,357,679 | 12/1967 | Gulick | 251/172 |
| 3,488,033 | 1/1970 | Priese | 251/315 |
| 3,497,176 | 2/1970 | Priese | 251/172 |
| 3,503,415 | 3/1970 | DeAngelis et al. | 251/315 |
| 3,698,687 | 10/1972 | Kitamura | 251/315 |
| 4,124,036 | 11/1978 | Rogers | 251/315 |
| 4,157,170 | 6/1979 | McClurg | 251/315 |

FOREIGN PATENT DOCUMENTS 2023773 1/1980 United Kingdom .

*Primary Examiner*—William R. Cline
*Assistant Examiner*—H. Jay Spiegel
*Attorney, Agent, or Firm*—Oblon, Fisher, Spivak, McClelland & Maier

[57] ABSTRACT

Disclosed is a ball valve with seats having means to relieve harmful build-up of cavity pressure. The heel of the valve seat has grooves therein allowing cavity pressure to be applied over a portion of the seat surface in a fashion that produces a resultant force in a lip region of the seat. This resultant force causes the lip region of the seat temporarily to move away from the ball and thus vent the cavity pressure to a lower pressure zone.

3 Claims, 7 Drawing Figures

BALL VALVE TO RELIEVE CAVITY PRESSURE

BACKGROUND OF THE INVENTION

In certain types of double seated valves, including ball valves, fluid can be trapped in the cavity enclosed by the seats when the valve is in the closed position. If this fluid is heated, there will be an increase in pressure in this cavity due to fluid expansion. Examples of this phenomenon include a valve used with liquid chlorine at −50° F. being warmed by the sun, or a valve containing liquid hydrocarbons being heated by a fire. If not vented in some way, the consequences of this cavity pressure rise may range from seat distortion resulting in a leaking valve to deformation or destruction of the valve body with a concomitant catastrophic release of the fluid medium to the atmosphere.

One prior art method of solving the problem of cavity pressure build-up involves drilling a hole through the side of the ball so the hole will be pointed in an upstream direction when the ball valve is closed. As the cavity pressure begins to build up, it simply vents into the upstream pipe which is at a lower pressure than the heated cavity. A major drawback of this technique is that the valve becomes unidirectional, i.e. it can only be installed in a line with the vent hole in the ball pointing upstream when the valve is closed. Since this subjects the valve to the risk of improper placement in the field or to inapplicability when the line is to be used to convey fluids in either direction, it has met with less then enthusiastic reception among valve users.

SUMMARY OF THE INVENTION

The present invention is particularly useful in a ball valve of the type disclosed in commonly assigned U.S. Pat. No. 2,945,666, now expired, and provides grooves strategically placed in the heel of a seat ring to redirect the pressure in the cavity and thereby control the net resultant force vector present in the seat. This resultant force vector, when increased by an increase in cavity pressure, tends temporarily to move the lip of the valve seat away from the ball, and vent the cavity pressure therebetween. The placement of grooves in the heel of the seat allows the heel configuration to be shaped in a manner to help support the ball as it moves downstream under high pressure, yet still allows the cavity pressure to be applied over that portion of the seat surface that will result in the above discussed force vector.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DESCRIPTION OF THE PREFERRED EMBODIMENTS

Figure 1:
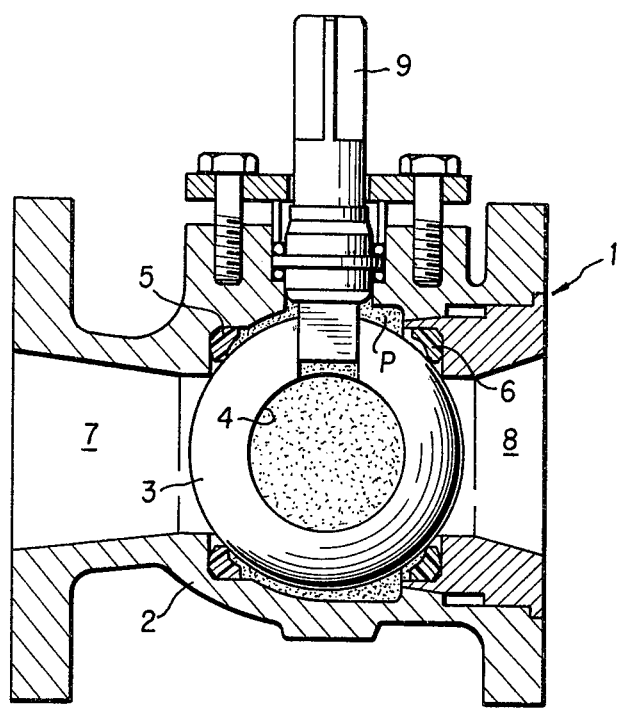
FIG. 1 is a cross-sectional view of a ball valve showing the region in which pressure will build up during heating of the valve.

FIG. 1 shows a ball valve 1 having a housing 2, a ball 3 having a port 4 formed therethrough, and seats or sealing rings 5 and 6 surrounding flow ports 7 and 8, respectively. The ball valve 1 is shown in its closed position, and the valve is actuated to its open position by rotating stem 9 90° about its longitudinal axis. The region in which harmful build-up of cavity pressure occurs is strippled in FIG. 1 and designated as region P.

Figures 2, 3:
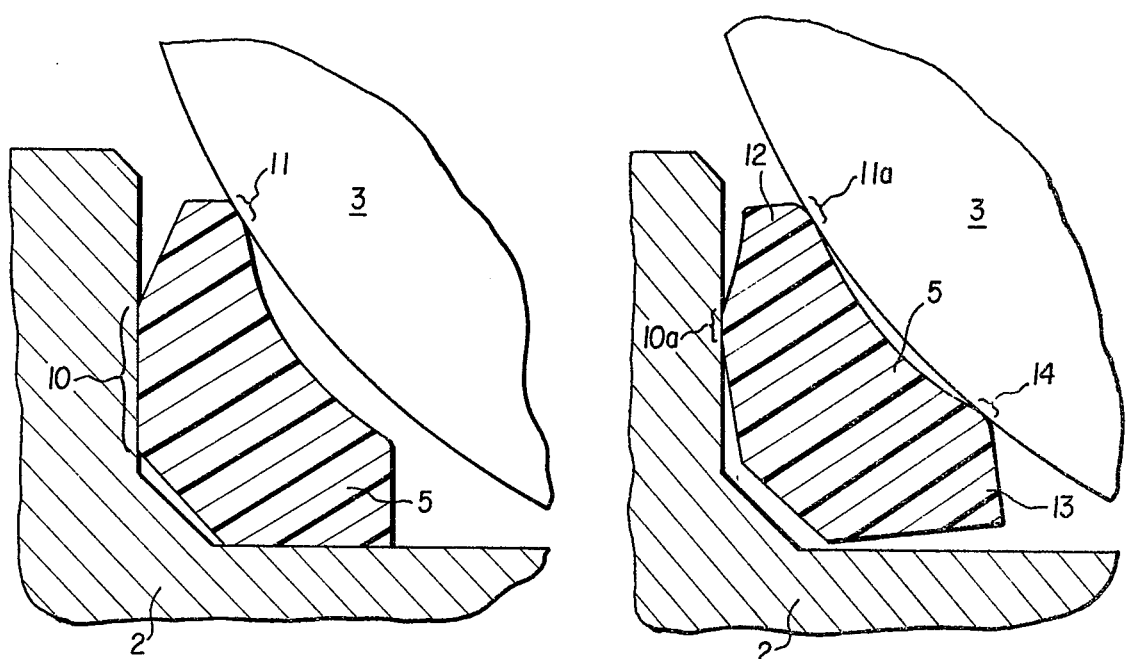
FIG. 2 is a cross-sectional view of a ball valve seat and portions of the valve ball and valve housing demonstrating their configuration in the absence of line pressure or cavity pressure.
FIG. 3 is a cross-sectional view similar to FIG. 2, but showing the configuration of the seat when the ball moves downstream under the influence of line pressure.

Ball valve sealing ring 5 is partially shown in cross-section in FIG. 2, positioned in a complementary shaped groove in valve housing 2, and being contacted by ball 3. The seat 5, as illustrated in FIG. 2, is unstressed and two contact zones are specifically designated as the body-seat contact zone 10 and the ball-seat contact zone 11. FIG. 2 serves as a useful comparison for the discussion to follow, particularly for an understanding of various seat deformations that occur under stress.

FIG. 3 illustrates schematically the change in cross-sectional shape of the seat 5 when the ball valve is assembled and ready for operation. Assembly causes a predetermined lip deflection and torsional windup in the seat to bring localized stress at the contact zones shown to a level where fluid pressure may be effectively sealed. Heel portion 13, through a phenomenon known as torsional windup, lifts away from the housing groove and contacts the ball at a new point of contact 14 designated as the ball-seat heel contact zone. At the same time, the torsional windup reduces the extent of body seat contact zone 10 that existed in FIG. 2 to a new, reduced body-seat contact zone 10a. Simultaneously, as seat lip 12 deflects toward the housing, the zone of ball-seat contact 11a shifts radially outwardly from its unstressed position that was designated as 11 in FIG. 2.

Figure 4:
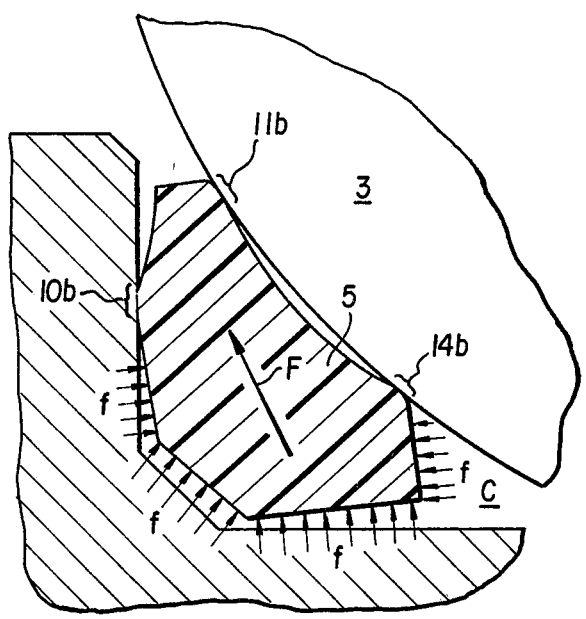
FIG. 4 is a cross-sectional view similar to FIG. 3, but showing the resolved force vector resulting from a build up of cavity pressure in the absence of the present invention.

FIG. 4 illustrates the seat in a configuration similar to FIG. 3 but illustrates the effect of a valve pressurized with a given line pressure, and a rise in cavity pressure to a level greater than the given line pressure. As the cavity pressure builds up in cavity C, cavity pressure forces f act on that portion of the surface of the seat between body seat contact zone 10b and ball-seat heel contact zone 14b. The resolved force vector F, resulting from the unbalanced cavity pressure forces f, is in the direction of the lip 12 and results in a tighter seal at contact zones 10b and 11b. This tighter seal is undesirable since it tends to resist a venting action of the built up cavity pressure.

In my invention, I have found that if grooves are provided in the heel portion of the seat, cavity pressure would also be able to act against that portion of the seat surface located between zones 11b and 14b (FIG. 4), resulting in a change in direction of the resolved force vector. While the same effect would be possible if the entire heel portion of the seat was cut away in the region of zone 14b, this would be a less desirable solution, since the heel of the seat could not then serve as a load bearing member. When the heel zone of the seat can support the ball against high line pressure, the lip is protected from permanent deformation, which would result in leakage of the valve. Heel support is particularly important with softer seat materials such as TFE, which seat materials are often used in services where cavity pressure can build up.

Figure 5:
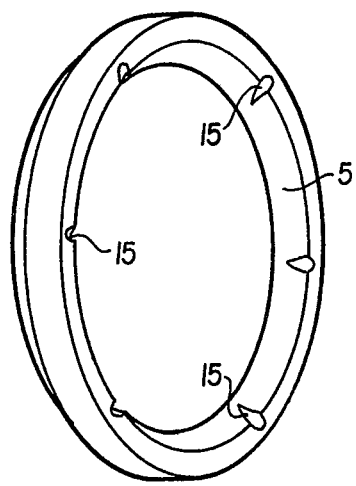
FIG. 5 is a perspective view of the valve seat having grooves formed in the heel of the seat according to the present invention.
Figure 6:
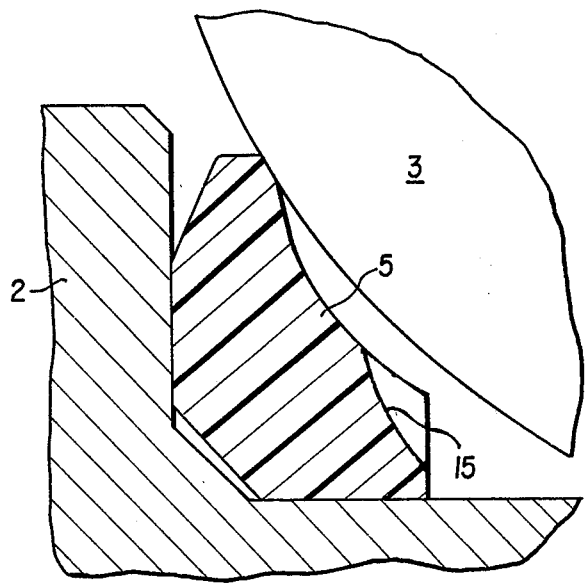
FIG. 6 is a cross-sectional view of the seat of FIG. 5 taken across one of the heel grooves.

Grooves 15 are formed transversely across the sharp edge of the heel portion of the seat as shown in FIGS. 5 and 6. The number of grooves may vary, but I have found six grooves to be an appropriate number. FIG. 6 shows the seat positioned in housing 2 and in contact with ball 3, but the seat is in an unstressed condition.

Figure 7:
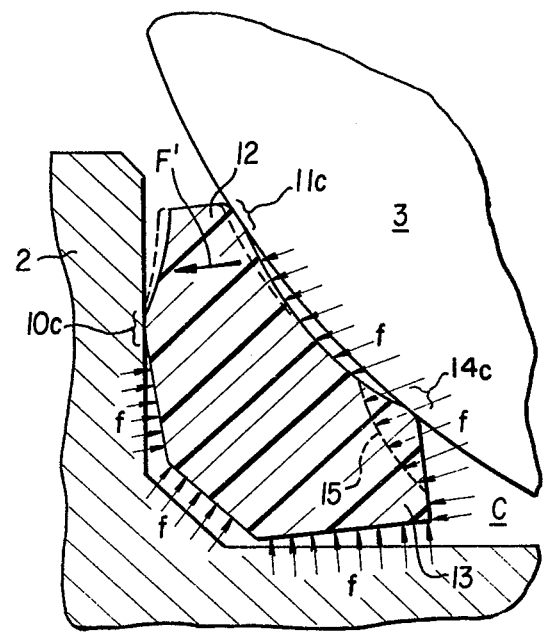
FIG. 7 is a cross-sectional view similar to FIG. 4 showing how the heel grooves permit the cavity pressure to create a resolved force vector in the region of the seat lip, thereby allowing the cavity pressure to be relieved.

FIG. 7 is a view similar to FIG. 6, but showing the effect of pressurization with a given line pressure, and a rise in cavity pressure to a level greater than the given line pressure. Groove 15 permits cavity pressure to act against that portion of the seat surface between zones 11c and 14c, and cavity pressure also acts on that portion of the seat surface between zone 14c clockwise toward zone 10c. The cavity pressure forces are indicated by the letter f. Although the grooves 15 interrupt sealing at zone 14c, ball 3 is still in contact with heel portion 13 of seat 5 and the heel portion thus performs the above described load bearing function.

It is noted that, with cavity pressure forces also acting on the seat surface between zones 11c and 14c, the resolved force vector F shown in FIG. 4 is redirected to resolved force vector F' in FIG. 7. The direction of force vector F tends to increase sealing at zones 10b and 11b, but the redirected force vector F', while increasing the seal in zone 10c, is directed away from zone 11c. As the cavity pressure builds up, thereby increasing cavity pressure forces f, lip 12 of seat 5 will temporarily deflect away from ball 3 and vent cavity pressure upstream, past zone 11c. This deflection is shown in phantom lines in FIG. 7.

The ease with which this lip deflection occurs is a function of the radial distance between zone 10c and 11c. The greater the distance, the less force required for cavity pressure relief, and, of course, zone 10c must be radially outward of zone 11c as measured from the central flow axis.

As is apparent, various modifications of my invention are possible such as drilling port holes across the seat heel rather than grooves, or the like, and I do not intend to be limited to the details of the construction herein shown and described, other than as defined in the appended claims.

What is claimed as new and desired to be secured by Letters Patent of the United States of America is:

1. A ball valve capable of relieving cavity pressure, comprising:
   a housing with a cavity and having an inlet and an outlet port;
   a ball in said cavity and having a port formed therethrough for alignment with the inlet and outlet ports;
   a valve seat ring positioned on each side of the ball between the ball and the housing, each said seat ring being generally kidney shaped in transverse cross section, with the radially inner peripheral part thereof defining a lip portion and the radially outer peripheral part thereof defining a heel portion, the lip portion and heel portion each having a ball contact zone and a housing contact zone, the housing contact zone of the lip portion being located radially inward of the heel portion, that part of the lip portion which faces the housing between the housing contact zone and the radially innermost part of the lip portion being tapered toward the ball axis defining a clearance space with the housing, and in the absence of cavity pressure the lip portion being in contact with both the ball and housing and the heel portion being in contact with the housing but spaced from the ball, and in the presence of cavity pressure the lip portion being in contact with both the housing and ball and the heel portion being in contact with the ball but spaced from the housing, so that in the presence of cavity pressure, cavity pressure forces act on the radially outer part of the seat ring between the lip ball contact zone and the lip housing contact zone; and
   vent means on the heel portion to establish communication from the cavity to that part of the seat ring which faces the ball between the heel ball contact zone and the lip ball contact zone, to permit cavity pressure forces to be applied to such part which will collectively result in a resolved force sufficient to deflect the lip portion away from the ball and vent cavity pressure when it reaches a predetermined level, the clearance space which is provided at that part of the lip portion facing the housing enabling the lip to deflect and venting to occur from either the upstream or downstream side of the ball.

2. The ball valve of claim 1 wherein said vent means is a groove formed across the ball contact zone of said heel portion.

3. A ball valve capable of relieving cavity pressure, comprising:
   a housing with a cavity and having an inlet and an outlet port;
   a ball in said cavity and having a port formed therethrough for alignment with the inlet and outlet ports of the housing;
   a valve seat ring positioned on each side of the ball between the ball and the housing, and in the at-rest condition being in both radial and axial contact with the housing, each said seat ring being generally kidney shaped in transverse cross section, with that portion of the seat ring facing the ball being concave and that portion facing housing being convex, the radially inner peripheral part thereof defining a lip portion and the radially outer peripheral part thereof defining a heel portion, the lip portion and heel portion each having a relatively small ball contact zone and a housing contact zone, the housing contact zone of the lip portion being located radially inward of the heel portion, that part of the lip portion which faces the housing between the housing contact zone and the radially innermost part of the lip portion being tapered toward the ball axis defining a clearance space with the housing, and in the absence of cavity pressure the lip portion being in contact with both the ball and housing and the heel portion being in contact with the housing but spaced from the ball, and in the presence of cavity pressure the lip portion being in contact with both the housing and ball and the heel portion being in contact with the ball but spaced from the housing, so that in the presence of cavity pressure, cavity pressure forces act on the radially outer part of the seat ring between the lip ball contact zone and the lip housing contact zone; and vent means on the heel portion to establish communication from the cavity to that part of the seat ring which faces the ball between the heel ball contact zone and the lip ball contact zone, to permit cavity pressure forces to be applied to such part which will collectively result in a resolved force sufficient to deflect the lip portion away from the ball and vent cavity pressure when it reaches a predetermined level, the clearance space which is provided at that part of the lip portion facing the housing enabling the lip to deflect and venting to occur from either the upstream or downstream side of the ball.

* * * * *